June 15, 1965 K. C. YARBOROUGH 3,189,110
WEIGHING APPARATUS
Filed June 6, 1963 5 Sheets-Sheet 3

INVENTOR.
Kenneth C. Yarborough
BY
Attorneys

June 15, 1965  K. C. YARBOROUGH  3,189,110
WEIGHING APPARATUS
Filed June 6, 1963  5 Sheets-Sheet 4
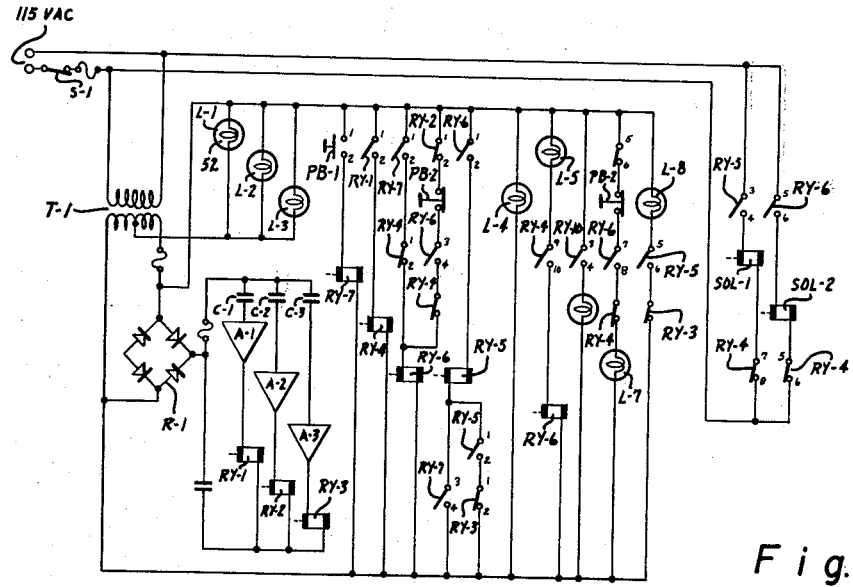
Fig. 5
Fig. 6
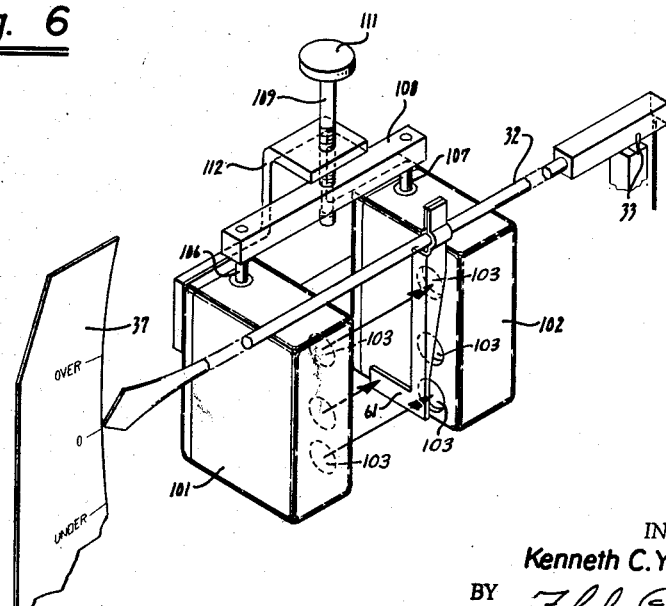
INVENTOR.
Kenneth C. Yarborough
BY
Attorneys June 15, 1965  K. C. YARBOROUGH  3,189,110
WEIGHING APPARATUS
Filed June 6, 1963  5 Sheets-Sheet 5
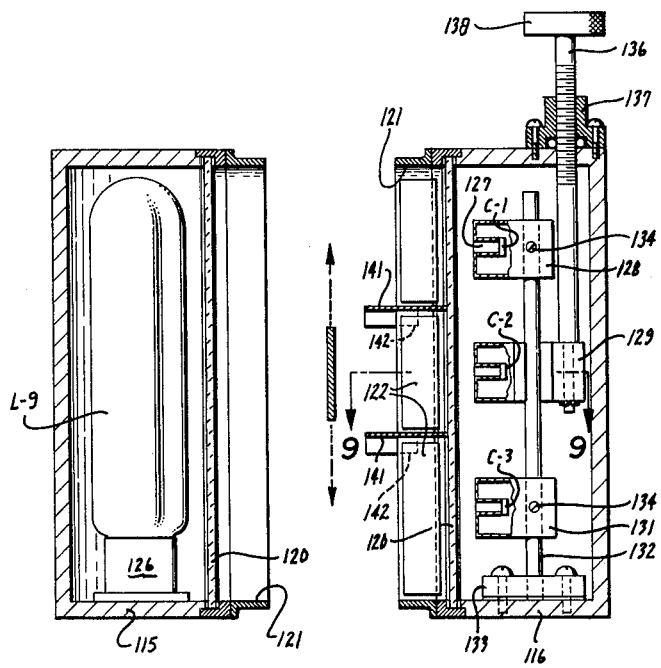
Fig. 8
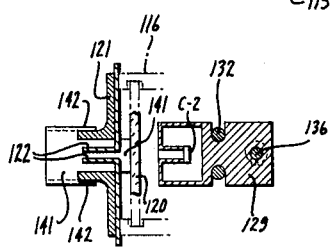
Fig. 9
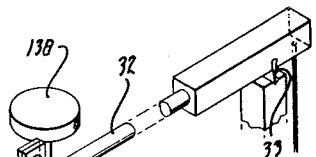
Fig. 7
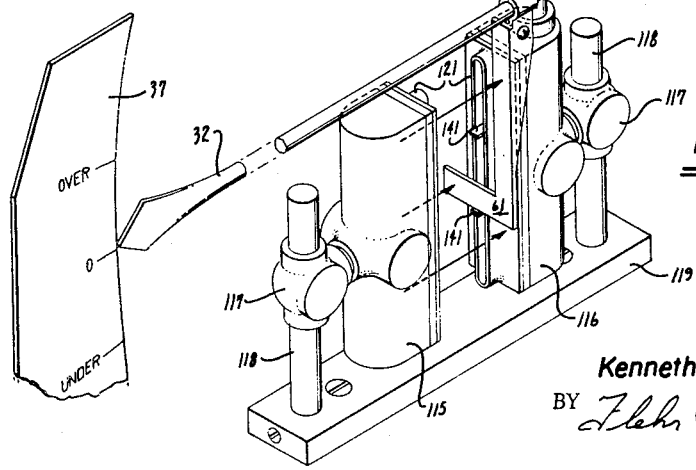
INVENTOR.
Kenneth C. Yarborough
BY
Attorneys United States Patent Office 3,189,110
Patented June 15, 1965

3,189,110
WEIGHING APPARATUS
Kenneth C. Yarborough, 754 21st St., Richmond, Calif.
Filed June 6, 1963, Ser. No. 286,062
10 Claims. (Cl. 177—81)

This invention relates to a weighing apparatus and more particularly to an automatic weighing apparatus.

In my copending application Serial No. 84,009, filed January 23, 1961, now U.S. Pat. No. 3,131,780, I have disclosed a weighing apparatus which has operated very satisfactorily. However, I have found that the apparatus therein disclosed does not particularly lend itself to mounting of the circuitry within an explosion-proof housing. Also, such apparatus does not particularly lend itself to use with over and under indicators and scales. There is, therefore, a need for a new and improved automatic weighing apparatus which overcomes the above named disadvantages.

In general, it is an object of the present invention to provide a weighing apparatus which is able to perform weighing operations with very great accuracy.

Another object of the invention is to provide a weighing apparatus of the above character which can be utilized on beam type or dial type scales.

Another object of the invention is to provide weighing apparatus of the above character in which relatively simple means is provided for preloading the balance beam of the scale to determine the point of bulk shut-off and to regulate the range of dribble flow in approaching balance position.

Another object of the invention is to provide a weighing apparatus of the above character which can be incorporated in conventional over and under indicators.

Another object of the invention is to provide a weighing apparatus of the above character in which the dribble quantity and the dribble rate can be readily adjusted.

Another object of the invention is to provide a weighing apparatus of the above character in which the circuit elements can be readily mounted in explosion-proof housings without affecting the operation of the apparatus.

Another object of the invention is to provide a weighing apparatus of the above character in which bulk and dribble flow are terminated by photoelectric means.

Another object of the invention is to provide apparatus of the above character in which an overload shut-off is also operated by photoelectric means.

Additional objects and features of the invention will appear from the following description in which the preferred embodiments have been set forth in detail in conjunction with the accompanying drawings.

Referring to the drawing:

FIGURE 5 is a circuit diagram utilized in my apparatus shown in FIGURES 1–4.

FIGURE 6 is an isometric view of another embodiment of my weighing apparatus mounted in explosion-proof housings.

FIGURE 7 is an isometric view of still another embodiment of my weighing apparatus mounted in an explosion-proof housing.

FIGURE 8 is a cross-sectional view of the apparatus shown in FIGURE 7.

FIGURE 9 is a cross-sectional view taken along the line 9—9 of FIGURE 8.

Figure 1:
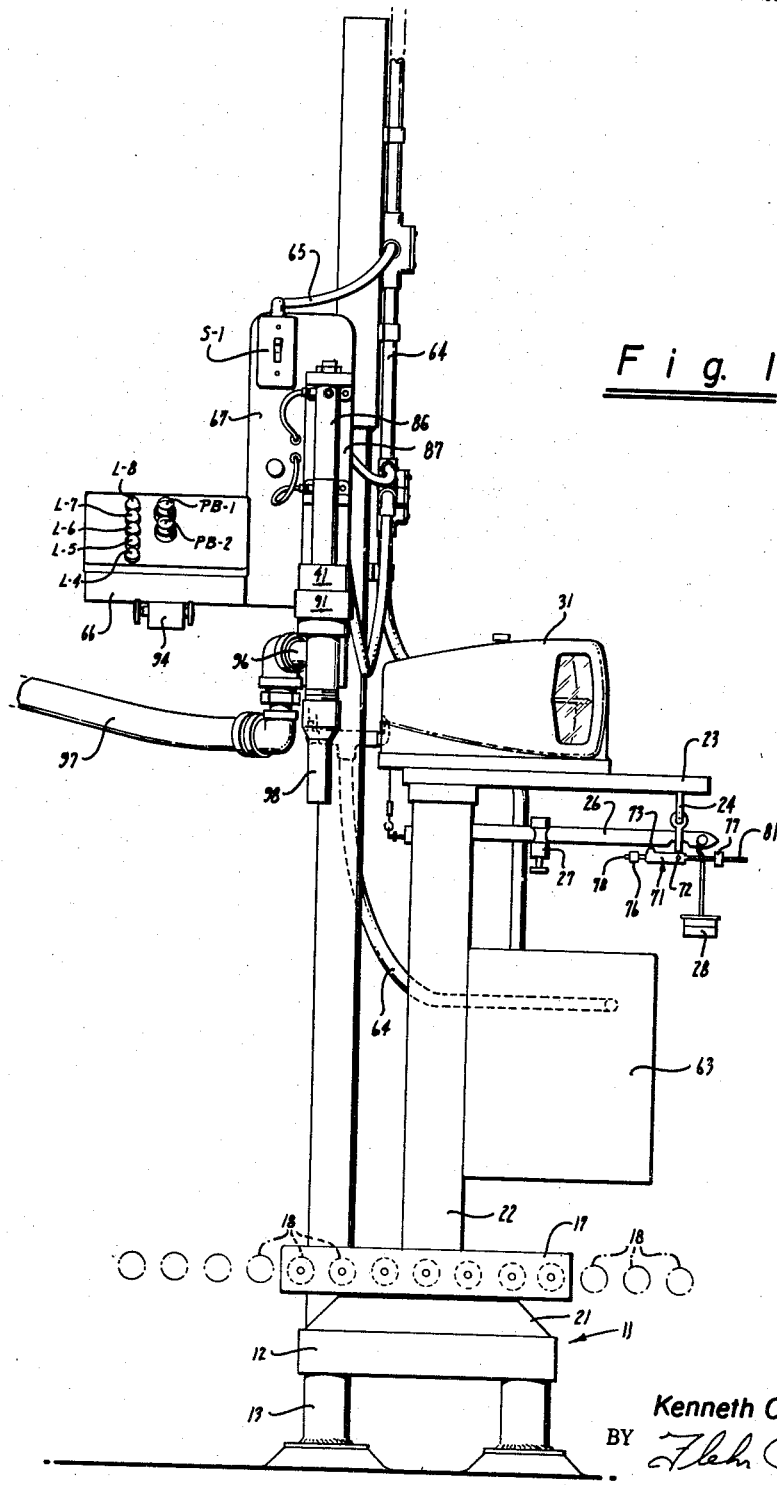
FIGURE 1 is a front elevational view of an automatic weighing apparatus incorporating my invention.

In general, my weighing apparatus consists of a scale having a balance beam. Means is provided for adjusting the scale so that the balance beam assumes a balanced postion when the scale has weighed a predetermined weight of material. Bulk and dribble control means is provided which provides bulk and dribble flow of the material to be weighed by the scale. A light source and a pair of photosensitive elements adapted to receive light from the light source are associated with the scale. Circuit means connects the photosensitive element to the bulk and dribble control means. A vane is connected to the balance beam and is adapted to travel between the light source and the photosensitive elements to affect the passage of light to the photosensitive elements. The circuit means terminates the bulk flow from the control means when the vane affects the passage of light to one of the photosensitive elements as the balance beam begins to move towards the balance position and terminates the dribble flow from the control means when the vane affects the passage of light to the other of the photosensitive elements as the balance beam moves into a balanced position. Pre-loading means is provided for urging the balance beam to a balanced position and determines the point of bulk shut-off and also determines the range of dribble flow.

As shown in the drawings, the weighing apparatus consists of a scale support 11 which consists of a base 12 which is mounted upon a plurality of legs 13. The scale support also includes a vertical support column 14 which is mounted on the base 12 and supports certain parts of the weighing apparatus as hereinafter described. A scale of the platform type is mounted upon the scale support 11 and includes a platform 17 in which are mounted a plurality of rollers 18 to facilitate movement of containers such as the barrels 19 shown in broken lines in FIGURE 2 onto and off of the platform. The scale 16 also includes a base 21 which is mounted upon the base 12 of the scale support 11. A vertical support column 22 is secured to the base 21. The support column 22 supports a horizontally extending member 23 which carries a trig loop 24. The scale 16 also includes a balance beam 26 which extends through the trig loop 24 and upon which is mounted a poise 27. Counter-poise weights 28 are removably mounted on the outer end of the balance beam 26 as shown particularly in FIGURE 1.

An over and under indicator 31 of a suitable type such as Model No. 6101 manufactured by the Howe Scale Company is mounted upon the top of the horizontally extending member 23. The over and under indicator 31 is provided with a pointer 32 which has its fulcrum at 33 and which is connected to the balance beam 26 by a chain 34. The over and under indicator is provided with a scale 37 which can be utilized to determine whether the proper amount of material has been weighed out and to give an exact indication of the amount and whether it is over or under a predetermined amount.

Bulk and dribble control means 41 is mounted upon the support column 14 in a manner hereinafter described and is utilized for controlling bulk and dribble flow of the material being weighed by the apparatus. The bulk and dribble control means can be in the form of separate bulk and dribble control valves as disclosed in my copending application Serial No. 84,009, filed January 23, 1961, or can be a single valve as shown in the drawing. A single valve of suitable type is manufactured by Delta Instrument Co. of El Cerrito, California. The filling valve consists of a differential air cylinder operating a piston-type valve. The piston valve contains multiple inlet ports which, in area, equal the diameter of the inlet pipe to the valve. The valve is movable between three positions as hereinafter described, that is, between a full open position, an intermediate adjustable position and a closed position to provide bulk and dribble flow through the valve.

Circuit means is provided and includes a detector assembly 42 mounted within the over and under indicator 31. The detector assembly consists of a base plate 43 which is secured to the bottom portion of the over and under indicator 31 by suitable means such as screws 44. A pair of vertical spaced parallel rods are mounted in the base plate 43 and extend upwardly therefrom. A plate 47 connects the upper ends of the rods 46. Three separate plates or blocks 48, 49 and 51 are slidably mounted upon the rods 46. A position sensing assembly is mounted on each of the plates or blocks and consists of a light source 52 and a sealed photosensitive sensor element 53 of a suitable type such as a silicon solar cell. The lamps 52 and the sensors 53 are secured to the plates 48, 49 and 51 by suitable means such as brackets 54. The lamps are identified as L1, L2 and L3, respectively, and the cells are identified as C1, C2 and C3 in the circuit diagram in FIGURE 5. The sensing assembly mounted on the top plate 48 can be termed the "overload shut-off assembly." The sensing assembly mounted on the plate 49 can be termed the "balance or dribble shut-off assembly"; and the assembly mounted on the lower plate 51 can be termed the "bulk shut-off sensing assembly."

As hereinbefore pointed out, the plates 48, 49 and 51 are vertically adjustable with respect to the rods 46. However, the plates 48 and 51 are normally retained in a predetermined position on the rods by means of set screws 56. The middle plate 49 is adjusted vertically on the rods 46 by means of a long lead screw 57 which extends through the plates 47, 48, 51 and 43 and is threaded into the plate 49. A knob 58 is provided on the end of the screw 56 which extends out of the housing 59. A collar 60 secured to the screw 57 and engaging the plate 47 retains the screw 57 in engagement with the base plate 43. By rotation of the lead screw 57, it can be seen that the plate 49 and the sensing assembly carried thereby can be readily raised and lowered.

Means is provided for affecting the passage of light from the light sources 52 to the associated sensors 53 and consists of an opaque L-shaped vane 61 which is secured to the pointer 32 of the over and under indicator 31 as shown. As hereinafter described, the vane 61 is adapted to be moved to affect the passage of light to the sensor in each of the sensing assemblies.

As shown in FIGURE 5, the circuitry for my weighing apparatus also includes a transformer T1 for reducing the 115 volt A.-C. supply voltage to a suitable voltage as, for example, 6 volts. This voltage is supplied to a full wave rectifier R1. The lamps L1, L2 and L3 are supplied with suitable voltage from the transformer as, for example, 4 volts. The circuitry also includes relays RY1 through RY7, additional lamps L4 through L8, pushbuttons PB1 and PB2, and solenoids SOL-1 and SOL-2 which form a part of the bulk and dribble control means 41. The bulk of this circuitry is mounted in a cabinet 63 secured to the support column 22. The circuitry in the cabinet 63 is connected through a conduit 64 to the over and under indicator 31 and to another control cabinet which contains the lights L4–L6 and the two pushbuttons PB1 and PB2, and to an on-off switch 51 through conduits 65. The control cabinet 66 is mounted upon a plate 67 which is secured to the support column 14.

Means is provided for applying a predetermined preload to the balance beam and to move the balance beam towards the balance position and consists of a rectangular assembly 71 which is pivotally mounted on the lower end of the trig loop 24 at points 72. The rectangular assembly 71 includes a portion 73 which is adapted to engage the balance beam 26 as shown particularly in FIGURE 1. Means is provided for adjusting the amount of force applied by the assembly 71 to move the balance beam 26 towards the balance position and consists of a pair of weights 76 and 77. The weight 76 is threaded on a rod 78 affixed on a rear portion 73 of the framework 71. The weight 77 is threadably mounted on an elongate rod 81 extending forwardly from the rectangular frame 71. By adjustment of the weights 76 and 77, it can be seen that the beam 26 can be preloaded towards a balanced position to any desired extent for a purpose hereinafter described.

A vane 61 is formed of a relatively light material and is free to travel unobstructed between the light sources 52 and sensors 53 within the range limited by the configuration of pointer 32, fulcrum 33, chain 34, balance beam 26 and trig loop 24. The weight of the vane is constant and is compensated for by the beam scale adjustment.

The circuitry also includes three discriminator amplifiers A1, A2 and A3 of a conventional type which convert the output from the solar cells into a squarewave output. The output of the discriminator amplifier drives the three sensitive relays RY1, RY2 and RY3 which, in turn, control the power relays which operate the bulk and dribble control means 41 and the indicator lights L4–L8 as hereinafter described.

A pneumatic control system is provided which includes means for raising and lowering the bulk and dribble control means 41 in a vertical retilinear fashion and consists of a pneumatic actuator 86 which is mounted upon a heavy plate 87 secured to the plate 67. The actuator is provided with a rod 88 which is connected to a block 89 which is secured to the bulk and dribble control means 41 by a bracket 91. The block 89 is slidably mounted in a way 92 which is secured to the plate 87. The pneumatic actuator 86 is operated by the hand operated control valve 94.

The bulk and dribble control means 41 is provided with an inlet 96 which is connected to the supply material which is to be weighed by suitable means such as a hose 97. The bulk and dribble control means 41 is provided with a downwardly extending pipe 98 which is adapted to fit into the hole provided in the top of the barrel 19 which is to be filled. The solenoid operated valves SOL-1 and SOL-2 are provided for feeding air to the bulk and dribble control valve means 41. As explained previously, this valve has three positions: fully open or bulk; partially open or dribble; and fully closed or balance. The partially open position is established by differential pressure which can be adjusted by the operator with a regulator valve (not shown) to any filling rate desired.

Operation of my weighing apparatus may now be briefly described as follows. Let it be assumed that a suitable container has been placed on the scale such as a barrel 19 shown in FIGURE 2 of the drawings and that it is desired to place a predetermined quantity of a material such as oil in the barrel. A sufficient number of counter-poise weights 28 are placed on the beam and the poise 27 is shifted to the desired position to give the total weight desired, that is, the weight of the container plus the weight of the material desired within the barrel as, for example, 450 lbs. The preloading means is then set to apply predetermined force to the beam 26 to move it towards the balance position as, for example, a force which would be equal to 10 lbs. of the material to be weighed. This can be readily accomplished by adjusting the weight 77 to the desired position on the threaded rod 81.

The power is then turned on to the apparatus by closing the switch S1. Closing of the switch S1 lights the lamps L1, L2 and L3 which are a part of the detector assembly 42. The lamp L4 is also lit. Assuming there is no material in the barrel, the vane 61 will be in its lowermost position in which it will not obstruct the light to any of the photocells C–1, C–2 and C–3. The circuit arrangement of the amplifiers A–1, A–2 and A–3 is such that when light strikes the photcells C–1, C–2 and C–3, the sensitive relays RY–1, RY–2 and RY–3 are deenergized.

Figure 2:
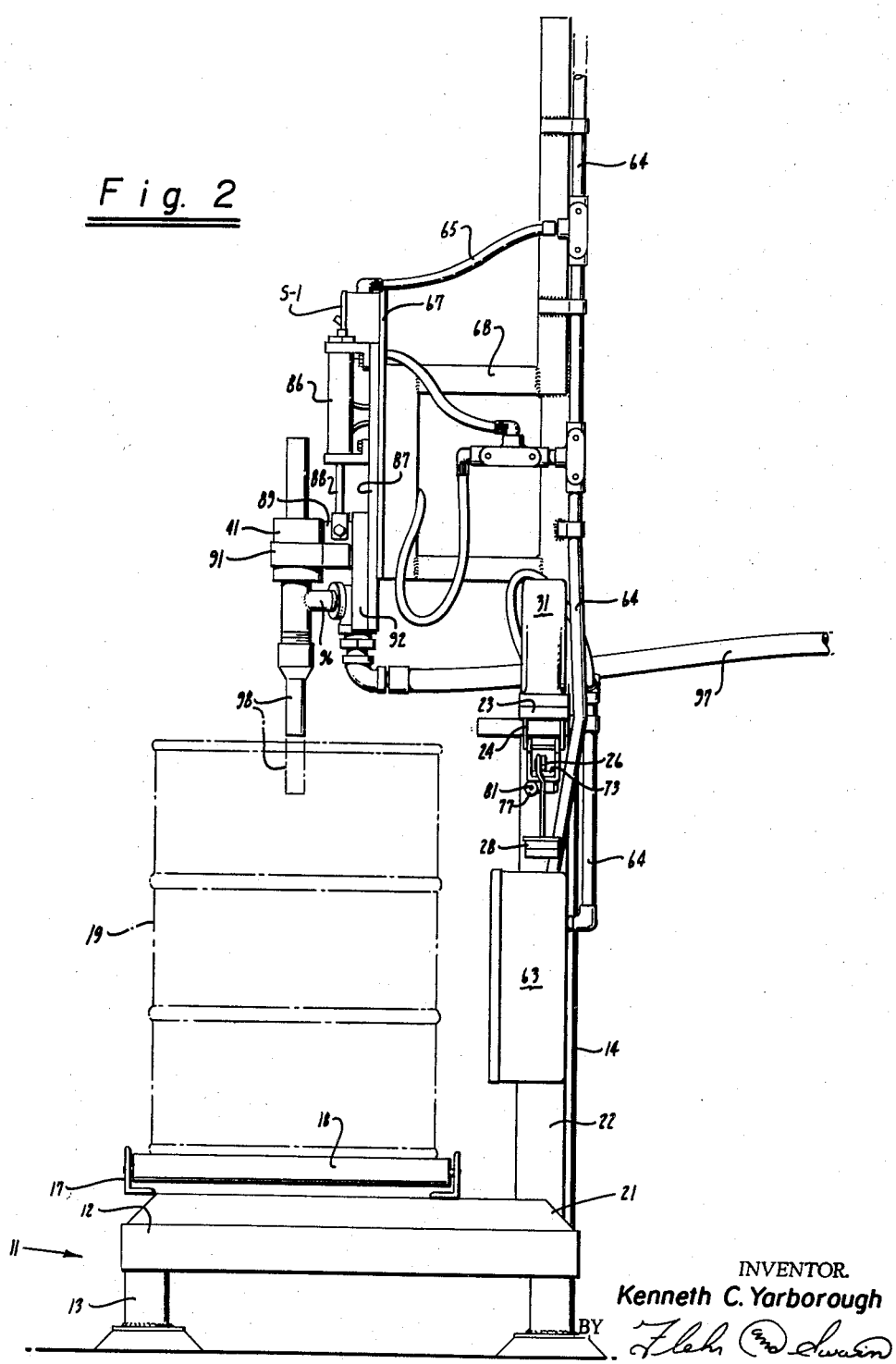
FIGURE 2 is a side elevational view of the apparatus shown in FIGURE 1.
Figure 3:
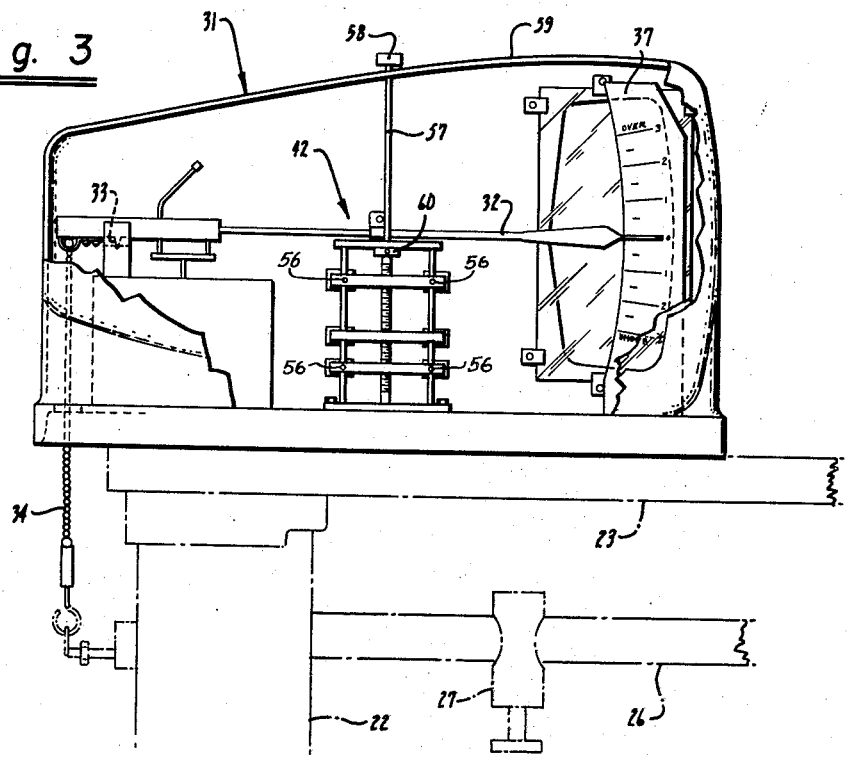
FIGURE 3 is an enlarged detail view with certain parts broken away of an over and under indicator together with the photoelectric sensing means incorporated therein.
Figure 4:
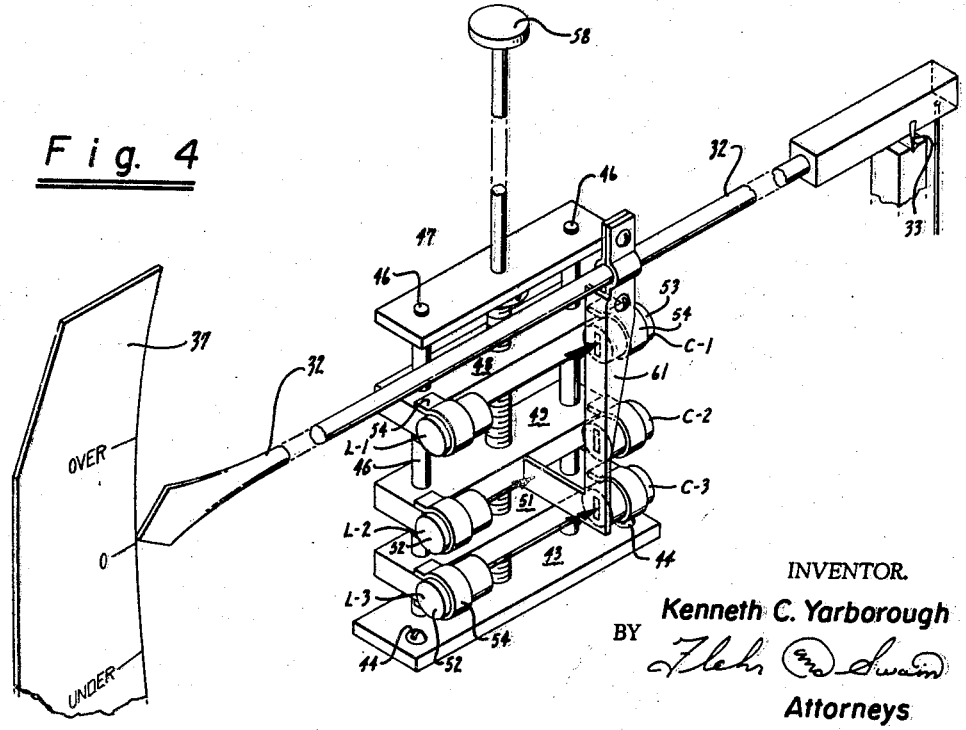
FIGURE 4 is an isometric view of a portion of the apparatus shown in FIGURE 3.

The control valve 94 is then actuated by striking the left-hand button as viewed in FIGURE 1 with the palm to cause the air to be supplied to the cylinder 86 to lower the bulk and dribble control means 41 and to thereby lower the pipe extension 98 into the barrel. After this has been accomplished, the start pushbutton PB–1 is operated to start the automatic filling sequence. Operation of PB–1 energizes relay RY–7. Energization of relay RY–7 causes energization of relay RY–6 through normally open contacts 1 and 2 of relay RY–7 and through normally closed contacts 1 and 2 of relay RY–4. Relay RY–7 can be termed the "start" relay, whereas relay RY–6 can be termed the "dribble" relay.

As soon as relays RY–7 and RY–6 are energized, the bulk relay RY–5 is energized through contacts 3 and 4 of relay RY–7 and contacts 1 and 2 of relay RY–6. The bulk indicator light L8 is energized when contacts 3–4 of RY–7 are closed to energize relay RY–5 to close contacts 5 and 6 of relay RY–5. A holding circuit for relay RY–6 is established as soon as relay RY–2 is energized through contacts 1 and 2 of relay RY–2, through the normally closed pushbutton PB–2, contacts 3 and 4 of relay RY–6 and normally closed contacts 3 and 4 of relay RY–4. Similarly, a holding circuit is established for relay RY–5 as soon as it is energized through contacts 1 and 2 of relay RY–5 and normally closed contacts 1 and 2 of relay RY–3.

Upon energization of the relay RY–6, its contacts 5 and 6 are closed to energize the dribble solenoid SOL–2 through normally closed contacts 5 and 6 of relay RY–4. Similarly, as soon as relay RY–5 is energized, the bulk solenoid SOL–1 is energized through its normally open contacts 3 and 4 and through the normally closed contacts 7 and 8 of relay RY–4.

Thus, it can be seen that as soon as the start pushbutton PB–1 is operated, the relays RY–5 and RY–6 are energized to energize both the bulk and dribble solenoids SOL–1 and SOL–2 to start filling the barrel 19 at the maximum rate. The pushbutton PB–1 can be released as soon as the relays RY–5 and 6 are energized because of the holding circuits provided for these relays.

The material continues to run into the barrel 19 at its maximum or full rate. During this time, as the weight of the material within the barrel is increasing, the preloading means is continuously applying a predetermined force to the balance beam to urge it upwardly. Thus, assuming that the preloading means has been set so that the balance beam 26 will move towards the balance position at a certain weight as, for example, 10 lbs. below a desired weight, to cause the over and under indicator 31 to begin lifting the vane 61 that is carried thereby. As the vane 61 is lifted by the pointer 32, it will first affect the passage of light from the light source L3 to the cell C–3 which causes the amplifier A–3 to energize the relay RY–3. Energization of the relay RY–3 causes deenergization of the relay RY–5 by opening of its contacts 1 and 2. Deenergization of relay RY–5 deenergizes the solenoid SOL–1 which causes the bulk and dribble control means, namely, the valve 41, to terminate bulk flow through the same so that only dribble flow continues. Deenergization of the relay RY–3 also deenergizes the bulk flow indicator light L8 by opening its contacts 3 and 4. Energization of the relay RY–3 closes its contacts 9 and 10 to energize the dribble indicator light L7 through the normally closed contacts PB–2, contacts 7 and 8 of relay RY–6 and contacts 9 and 10 of relay RY–4.

Thus, it can be seen that dribble flow continues from the bulk dribble control valve 41 for the last 10 lbs. of material to be placed within the barrel 19. As this last portion of the material is placed within the barrel, the vane 61 gradually moves upwardly until it affects the passage of light from the light source L2 to the cell C–2, or, in other words, cuts off the passage of light from the source L2 to the source C–2. The plate 49 is adjusted in its position to carry the sensing assembly consisting of the light source L2 and the cell C–2 in a position so that when the vane cuts off sufficient light to the cell C–2 to energize relay RY–2, the scale beam is exactly at the balance position and the indicator 32 is at the zero position on the scale 37. Energization of the relay RY–2 energizes the balance light L6 by closing of its contacts 3 and 4 which indicates that the filling operation has been completed and that the proper amount of material has been placed in the barrel.

Energization of the relay RY–2 deenergizes relay RY–6 by opening of its contacts 1 and 2. Deenergization of relay RY–6 deenergizes the dribble solenoid SOL–2 to completely close the bulk and dribble control valve 41. Deenergization of the relay RY–6 also opens its contacts 7 and 8 to deenergize the lamp L7.

The valve 41 can then be raised by striking the right-hand actuator of the control valve 94 as viewed in FIGURE 1 to cause the actuator 86 to raise the valve 41 and to permit the barrel to be moved off of the scale. Thereafter, an additional barrel can be placed on the scale and the same sequence of operations commenced.

If, for any reason, it is desired to stop the filling operation at any time, the pushbutton PB–2 can be operated. Operation of the pushbutton PB–2 opens the holding circuit for the dribble relay RY–6. Deenergization of the relay RY–6 deenergizes the relay RY–5 through opening of the contacts 1 and 2 of relay RY–6. Thus, both solenoids SOL–1 and SOL–2 are deenergized to completely close the bulk and dribble control valve 41.

If, for some reason at any time, additional material is placed in the barrel or container 19 which moves the balance beam beyond the balance position, the vane 61 will be moved upwardly to cut off the light from the light source L1 to the cell C–1. As soon as this occurs, the relay RY–1 will be energized to close its contacts 1 and 2. Closing of the contacts 1 and 2 causes energization of the relay RY–4. Energization of the relay RY–4 opens its contacts 5 and 6, 7 and 8 to immediately deenergize the solenoids SOL–1 and SOL–2 to completely close the bulk and dribble control valve 41 to terminate all further flow of material into the barrel 19. Energization of relay RY–4 also deenergizes the relay RY–6 through its contacts 1 and 2, and 3 and 4. Deenergization of the relay RY–6 deenergizes the relay RY–5 so that the solenoids SOL–1 and SOL–2 are also deenergized because of the opening of the contacts on the other side of the solenoids. Energization of the relay RY–4 also energizes the overload lamp L5 through closing of the contacts 9 and 10. This light L5 indicates that a malfunction has occurred and that an improper weight of material is within the barrel 19.

In the embodiment shown in FIGURE 6, my weighing apparatus is mounted within explosion-proof housings 101 and 102. The housings are provided with vertically spaced transparent windows 103 of a suitable type. The lamps L1, L2 and L3 are mounted in the housing 101, whereas the photosensitive elements C1, C2 and C3 are mounted in the housing 102. The lamps are positioned so that light from the lamps will pass through the windows 103 and be received by the photosensitive elements provided in the housing 102.

The upper and lower lamps L1 and L3 and the upper and lower photosensitive elements C1 and C3 are fixed within the housings 101 and 102 in a suitable manner. The lamp L2 and the photosensitive element C2 are carried by vertically adjustable rods 106 and 107 which extend upwardly through the housings 101 and 102. These rods are affixed to a cross bar 108. A lead screw 109 is mounted in the bar 108 and is provided for adjusting the vertical position of the bar 108 and the elements carried thereby. The lead screw is provided with a knob 111 and is threaded into a bracket 112 secured to the rear of the explosion-proof housings 101 and 102.

A vane 61 is positioned between the two housings and is mounted upon the pointer 32. The vane is adapted to affect the passage of light from the lamp within the housing 101 to the associated photosensitive element within the housing 102. In all other respects, the operation of this embodiment is identical to that hereinbefore described for the embodiment shown in FIGURES 1–5. However, with this embodiment, it can be seen that any of the elements which may cause a spark are mounted within explosion-proof housings so that the weighing apparatus can be utilized in hazardous locations.

Still another embodiment of my invention mounted in explosion-proof housings is shown in FIGURES 7, 8 and 9. This embodiment consists of two housings 115 and 116 of a suitable type such as Type No. ELG 125 manufactured and sold by Crouse-Hinds. The housings 115 and 116 are provided with supporting brackets 117 which are slidably mounted upon vertical posts 118 mounted on a block 119 which is secured to the top of the scale.

The housings 115 and 116 are substantially semi-cylindrical in cross-section as shown in FIGURES 7 and 9 and are provided with vertical, relatively narrow openings in which sheets 120 of suitable transmitting material such as quartz are mounted within the housings to seal the openings. A hood 121 is mounted over each of the windows 120 and, as shown particularly in FIGURE 7, provides a relatively narrow slot for the passage of light. Vertically extending shutters 122 are mounted behind the hood 121 and are movable laterally across the opening to control the width of the slot exposed.

In place of the three lamps L1, L2 and L3, a single lamp L9 is mounted on a base 126 provided in the housing 115. This lamp can be of greater size utilizing a higher voltage such as 110 volts because it is being utilized in an explosion-proof housing. The photosensitive cells C1, C2 and C3 are mounted within the housing 116. The cells are mounted in horizontal recesses 127 provided in blocks 128, 129 and 131. Blocks 128 and 131 are adjustably secured on a pair of spaced rods 132 mounted in a block 133 provided in the housing 116. Screws 134 are provided to permit vertical adjustment of the blocks 128 and 131 vertically of the rods 132. A block 129 is slidably mounted on the rods 132 and means is provided for adjusting the block 129 vertically between the blocks 128 and 131 and consists of a lead screw 136 which has its lower end rotatably mounted in the block 129. The lead screw is threaded into a collar 137 which is mounted on the housing 116. The end screw is provided with a knob 138 to facilitate making the proper adjustment of the lead screw.

In order to obtain sufficient parallelism of the light so that the single source L9 which can be utilized for energizing each of the photosensitive cells C1, C2 and C3 selectively, a pair of vertically adjustable shields 141 have been provided. As shown particularly in FIGURES 8 and 9, the shields extend outwardly through the hood and lie in horizontal planes above and below the block 129. The shields 141 are retained in their desired positions by the hoods which grip the ears 141 provided on the shields.

Operation of this embodiment is also very similar to that hereinbefore described. The primary difference is that a single light source is utilized instead of three separate light sources. Particular means as hereinbefore described has been provided so that the cells C1, C2 and C3 will be selectively operated from this single light source. The vane 61 travels between the two housings and is adapted to affect the passage of light from the light source to the photosensitive element. To ensure that the cells are only affected by rays which pass substantially parallel from the lamp L9, the hoods have been provided in addition to the shields 141. In addition, the cells C1, C2 and C3 have been recessed in their respective blocks so that only substantially parallel rays of light will strike the cells.

It is apparent from the foregoing that I have provided a new and improved weighing apparatus which can be utilized for weighing materials with great accuracy. Although I have described my apparatus primarily in conjunction with a platform type scale, it is readily apparent that it can be readily utilized with dial type devices. As is well known to those skilled in the art, dial type scales also have balance beams to which my detector assembly can be readily attached.

The preloading means provided in my weighing apparatus is completely out of engagement with the balance beam when the balance beam is in a balanced position and, therefore, has no effect upon the accuracy with which the balance beam determines the balance position. The preloading means makes it possible to terminate bulk flow at a point at which it is possible to have a sufficient range of dribble flow so that the balance position is approached gradually to make it possible to determine the balance position very accurately. The preloading means places no force on the beam from the time of bulk shut-off to the balance position of the balance beam and even beyond the balance position to an overload position.

I claim:

1. In a weighing apparatus, a scale having a balance beam, means connected to the balance beam for adjusting the scale so that the balance beam will assume a balanced position when the scale weighs a predetermined weight of material, bulk and dribble control means providing bulk and dribble flow of the material to be weighed by the scale, means applying a predetermined pre-load to the balance beam to urge the balance beam towards a balanced position, at least one source of light, a pair of photosensitive elements adapted to receive light from the light source, circuit means connecting the photosensitive elements to the bulk and dribble control means, a vane connected to the balance beam and adapted to travel between the light source and the photosensitive elements to affect the passage of light to the photosensitive elements from the light source, said circuit means terminating bulk flow from the bulk and dribble control means when the vanes affects the passage of light to one of said photosensitive elements and terminating dribble flow from the bulk and dribble control means when the vane affects the passage of light to the other of said photosensitive elements.

2. Apparatus as in claim 1 together with an additional photosensitive element adapted to receive light from the light source and connected into said circuit means, and indicating means connected to said third photosensitive element so that as the vane affects the passage of light to said third photosensitive element, said indicating means is energized.

3. A weighing apparatus as in claim 1 wherein said scale has an over and under indicator, the over and under indicator having a pointer connected to the balance beam and wherein the vane is connected to the pointer.

4. A weighing apparatus as in claim 1 together with means connected to at least one photosensitive element for adjusting the position of said photosensitive element.

5. In a weighing apparatus, a scale having a balance beam, means connected to the balance beam for adjusting the scale so that the balance beam will assume a balanced position when the scale has weighed a predetermined weight of material, bulk and dribble control means providing bulk and dribble flow of the material to be weighed by the scale, means applying a predetermined pre-load to the balance beam to urge the balance beam towards a balanced position, a plurality of position detecting assemblies, each of the position detecting assemblies consisting of a light source and a photosensitive element adapted to receive light from the light source, circuit means connecting the photosensitive elements to the bulk and dribble control means, a vane connected to the balance beam and adapted to travel between the detecting assemblies to affect the passage of light to the photosensitive elements of the detecting assemblies, at least one of the detecting assemblies being adjustable relative to the vane, said circuit means terminating bulk flow from the bulk and dribble control means when the vane is moved and the balance beam begins to move towards the balanced position to affect the passage of light to one of said photosensitive elements and terminating dribble flow from the bulk and dribble control means when the vane is moved as the balance beam achieves a balanced position to affect the passage of light to the other of said photosensitive elements.

6. A weighing apparatus as in claim 5 wherein said scale includes an over and under indicator, the over and under indicator having a pointer connected to the balance beam, and wherein said detecting assemblies are mounted within the over and under indicator and the vane is connected to a pointer in the over and under indicator.

7. A weighing apparatus as in claim 5 together with an additional sensing assembly connected to the circuit means and indicating means connected to the third sensing assembly, said circuit means causing said indicating means to be energized when the vane is moved as the balance beam moves beyond a balanced position.

8. A weighing apparatus as in claim 1 together with a pair of explosion-proof housings, the source of light being mounted in one of the housings and the photosensitive elements being mounted in the other of the housings, each of the housings being provided with a transparent window so that light can pass from the light source to the photosensitive elements.

9. In a weighing apparatus, a scale having a balance beam, means for adjusting the scale so that the balance beam will assume a balanced position when the scale weighs a predetermined weight of material, bulk and dribble control means providing bulk and dribble control of the material to be weighed by the scale, means applying a predetermined pre-load to the balance beam to urge the balance beam towards a balanced position, a pair of explosion-proof housings, at least one source of light mounted in said first housing, at least a pair of photosensitive elements mounted in the other of the housings, each of the housings being provided with a transparent window so that the photosensitive elements can receive light from the light source, circuit means connecting the photosensitive elements to the bulk and dribble control means, a vane connected to the balance beam and adapted to travel between the housings to affect the passage of light to the photosensitive elements from the light source, said circuit means terminating bulk flow from the bulk and dribble control means when the vane affects the passage of light to one of said photosensitive elements and terminating dribble flow from the bulk and dribble control means when the vane affects the passage of light to the other of said photosensitive elements.

10. A weighing apparatus as in claim 9 wherein said source of light is a single source together with shield means mounted on the housing on which the photosensitive elements are mounted so that only parallel beams of light from the light source will strike the photosensitive element.

References Cited by the Examiner

UNITED STATES PATENTS

| 924,940 | 6/09 | Rough | 177—61 |
|---|---|---|---|
| 1,880,562 | 10/32 | Weckerly | 177—79 |
| 2,169,465 | 8/39 | Hadley | 177 |
| 2,197,514 | 4/40 | Barnes | 177 |
| 2,605,075 | 7/52 | Brown | 177—78 |
| 2,776,103 | 1/57 | Bradley | 177 |

LEO SMILOW, *Primary Examiner.*